(12) United States Patent
Thompson

(10) Patent No.: US 9,688,349 B2
(45) Date of Patent: Jun. 27, 2017

(54) BICYCLE TRANSMISSION

(71) Applicant: Robert William Thompson, Camberley (GB)

(72) Inventor: Robert William Thompson, Camberley (GB)

( * ) Notice: Subject to any disclaimer, the term of this patent is extended or adjusted under 35 U.S.C. 154(b) by 0 days.

(21) Appl. No.: 14/297,817

(22) Filed: Jun. 6, 2014

(65) Prior Publication Data

US 2014/0361511 A1  Dec. 11, 2014

(30) Foreign Application Priority Data

Jun. 6, 2013 (GB) .................................. 1310092.0

(51) Int. Cl.
| | |
|---|---|
| *B62M 1/26* | (2013.01) |
| *B62M 1/30* | (2013.01) |
| *B62M 1/36* | (2013.01) |
| *B62M 1/38* | (2013.01) |
| *B62M 3/08* | (2006.01) |
| *B62M 11/18* | (2006.01) |

(52) U.S. Cl.
CPC ................ *B62M 1/38* (2013.01); *B62M 1/26* (2013.01); *B62M 1/30* (2013.01); *B62M 1/36* (2013.01); *B62M 11/18* (2013.01); *B62M 3/083* (2013.01)

(58) Field of Classification Search
CPC . B62M 1/36; B62M 1/38; B62M 3/02; B62M 3/06; B62M 3/083; B62M 11/04; B62M 11/14; B62M 11/18; B62M 1/26; B62M 1/30

See application file for complete search history.

(56) References Cited

U.S. PATENT DOCUMENTS

| | | | | |
|---|---|---|---|---|
| 610,111 | A * | 8/1898 | Wagner | F16H 21/40 74/42 |
| 4,053,173 | A * | 10/1977 | Chase, Sr. | B62M 1/26 280/238 |
| 4,456,276 | A * | 6/1984 | Bortolin | B62M 1/32 280/257 |
| 4,721,015 | A * | 1/1988 | Hartmann | B62M 11/18 280/260 |
| 4,986,556 | A * | 1/1991 | Hartmann | B62M 1/38 280/260 |
| 6,209,900 | B1 * | 4/2001 | Yoshizawa | B62M 1/26 280/252 |

(Continued)

FOREIGN PATENT DOCUMENTS

| | | | | |
|---|---|---|---|---|
| CN | WO 2010121394 A1 * | 10/2010 | | B62M 1/26 |
| DE | 10127094 C1 * | 2/2003 | | B62M 11/16 |

(Continued)

*Primary Examiner* — Joseph Rocca
*Assistant Examiner* — Maurice Williams
(74) *Attorney, Agent, or Firm* — Invention To Patent Services; Alex Hobson

(57) ABSTRACT

A chainless drive mechanism for a bicycle using pedal arms, one on each side of the bicycle, each pedal arm carrying a pedal engageable with a rider's foot. Each pedal arm is mounted to a crank by a rotating joint and connected to the frame of the bicycle by a link, each link having rotating joints at each end. The cranks are connected by a shaft passing through the hub of to the driven wheel of the bicycle. The cranks may be connected to the driven wheel by a multi ratio free wheeling gear mechanism.

16 Claims, 5 Drawing Sheets

(56) References Cited

U.S. PATENT DOCUMENTS

| | | | | |
|---|---|---|---|---|
| 6,454,287 | B1 * | 9/2002 | Fujiwara | B62M 3/04 280/252 |
| 6,468,178 | B1 * | 10/2002 | Mohtasham | B62M 11/16 280/238 |
| 7,823,898 | B2 * | 11/2010 | Hartmann | B62K 5/05 280/253 |
| 2004/0194572 | A1 * | 10/2004 | Kim | B62M 3/02 74/594.3 |
| 2007/0228687 | A1 * | 10/2007 | Parker | B62K 11/06 280/252 |
| 2007/0275811 | A1 * | 11/2007 | Starik | B62M 11/18 475/259 |
| 2009/0278330 | A1 * | 11/2009 | Hartmann | B62K 5/05 280/202 |
| 2013/0125702 | A1 * | 5/2013 | Lin | B62M 3/083 74/594.6 |
| 2014/0333043 | A1 * | 11/2014 | Gendell | B62M 1/30 280/253 |
| 2014/0339787 | A1 * | 11/2014 | Chung | B62M 11/16 280/257 |
| 2014/0367940 | A1 * | 12/2014 | Lin | B62M 1/26 280/257 |

FOREIGN PATENT DOCUMENTS

| | | | | |
|---|---|---|---|---|
| GB | 554873 A * | 6/1943 | | B62M 11/14 |
| MX | WO 2014021702 A1 * | 2/2014 | | B62M 1/30 |

* cited by examiner

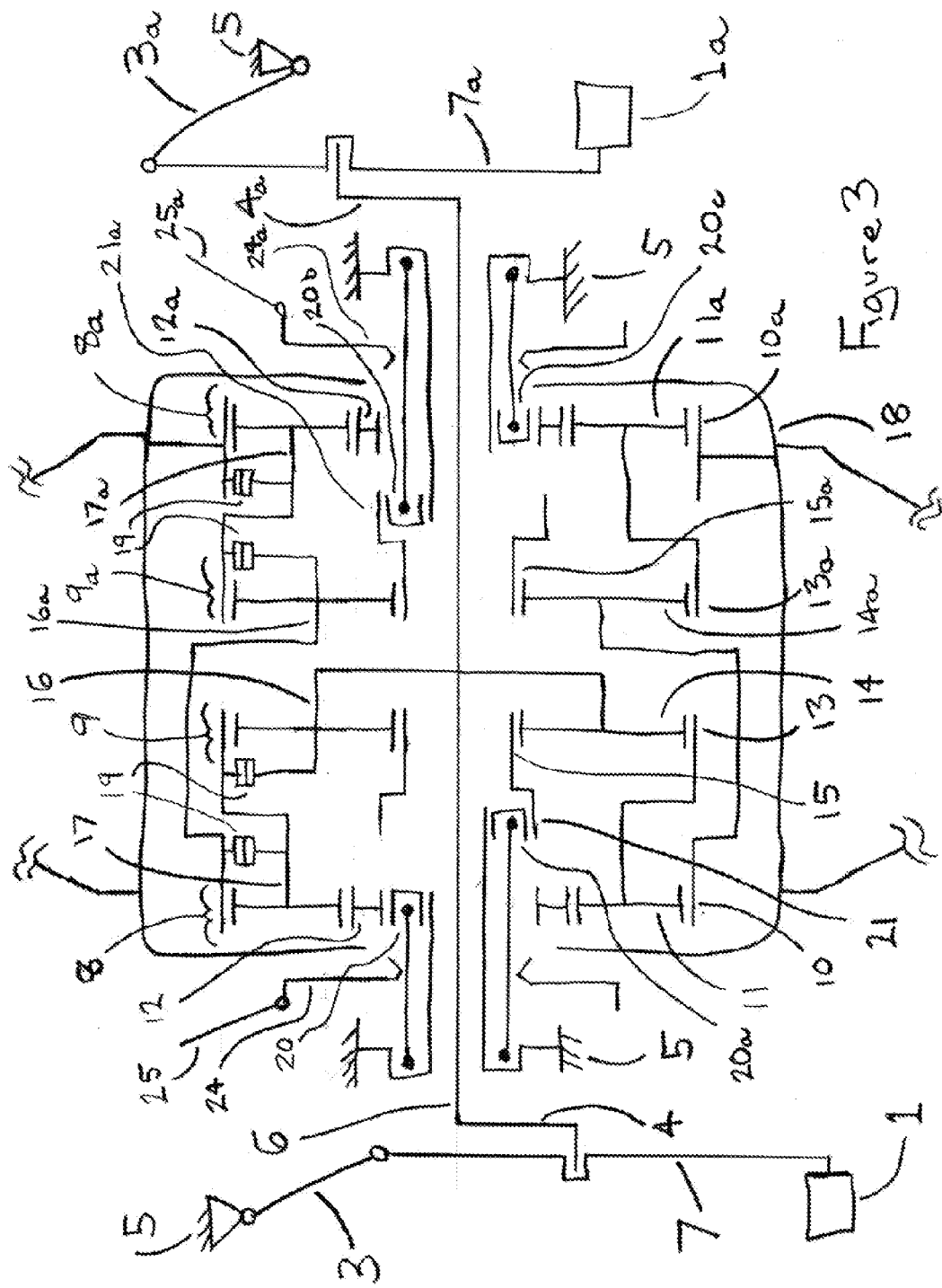

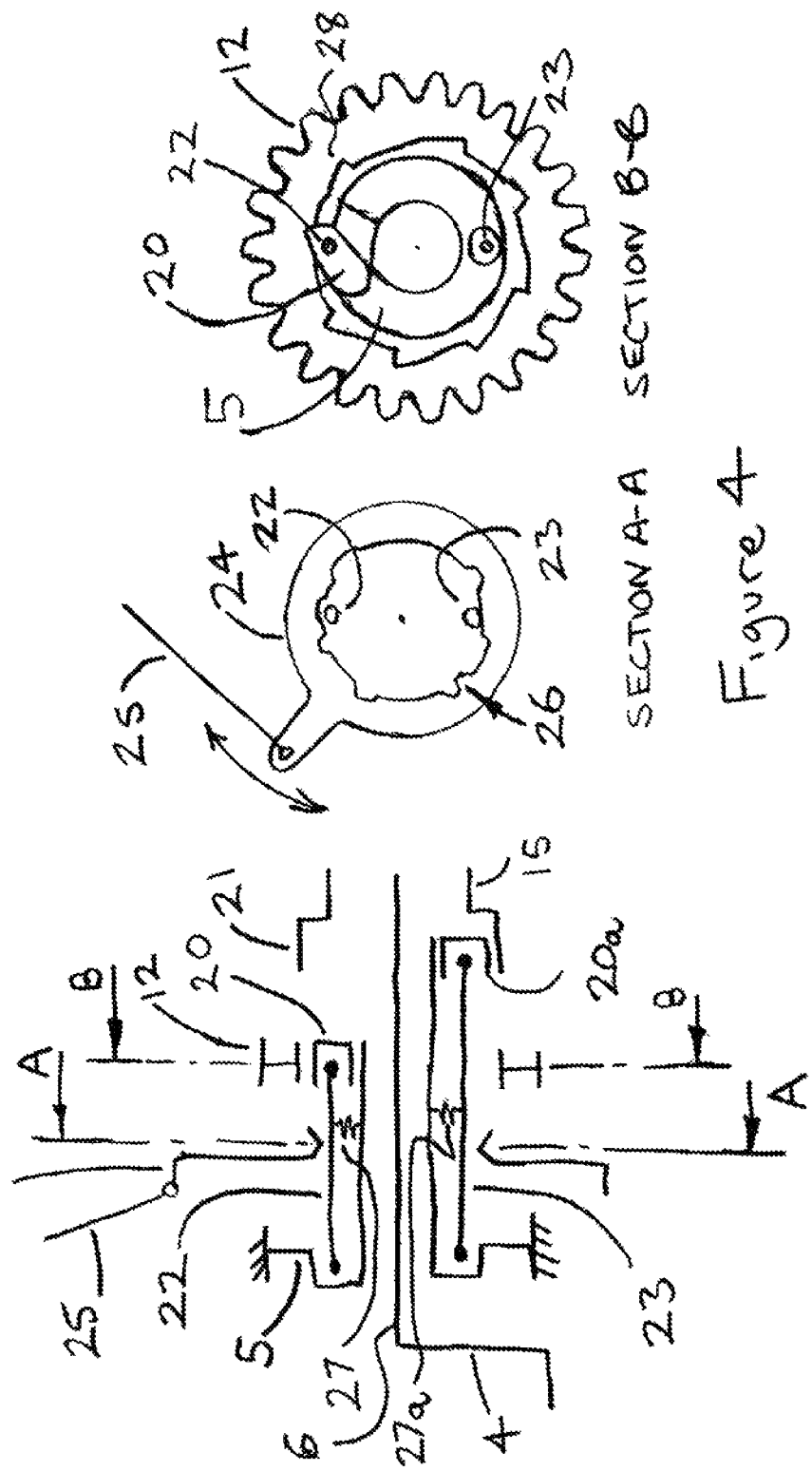

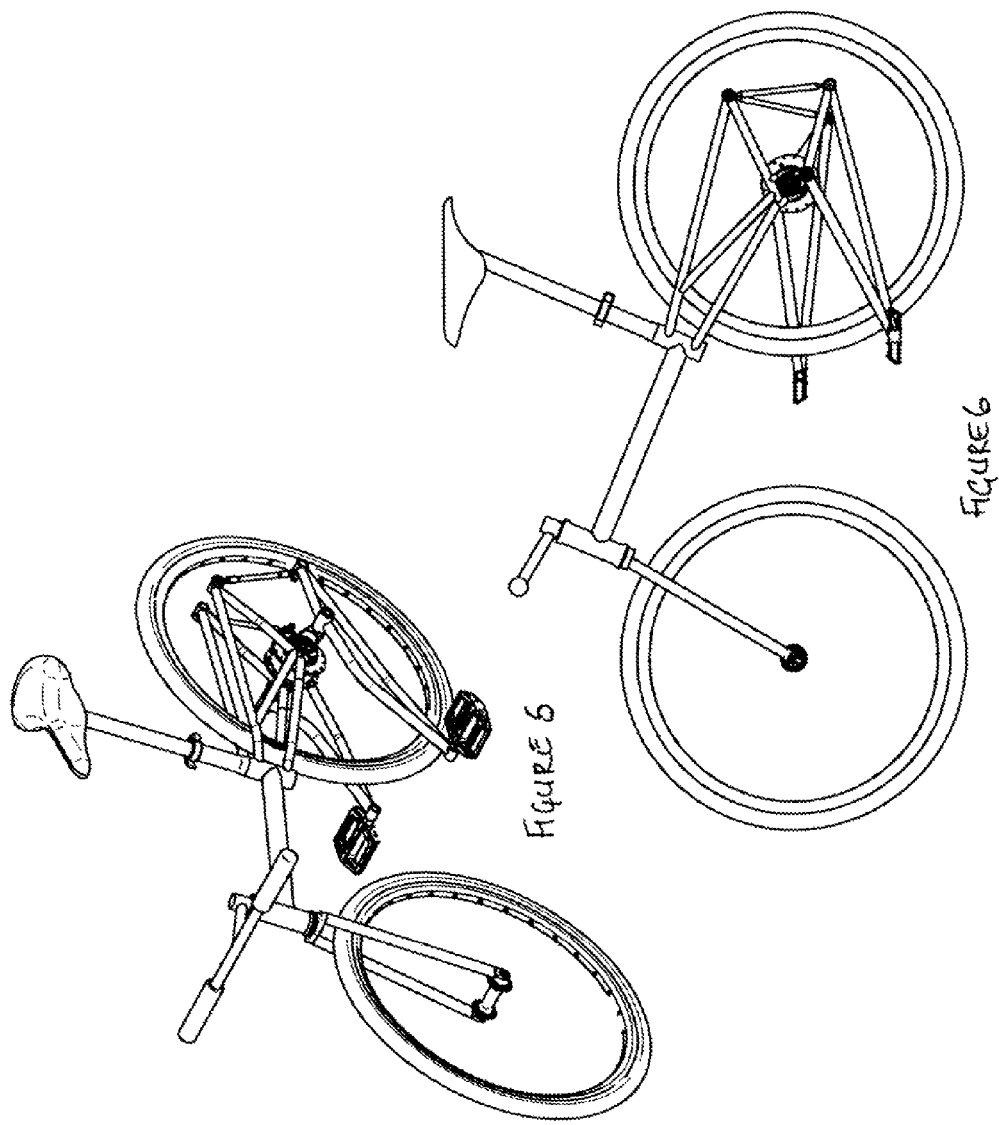

BICYCLE TRANSMISSION

CROSS REFERENCE TO RELATED APPLICATIONS

This application claims the benefit of patent application GB1310092.0 entitled Bicycle Transmission and filed on Jun. 6, 2013; of which the entirety is incorporated herein by reference.

BACKGROUND OF THE INVENTION

Field of the Invention

This invention relates to a drive mechanism/transmission mechanism for a bicycle.

Background

Bicycles commonly use roller chain transmissions, with multiple chain wheels and sprockets together with derailleur shifting mechanisms, to connect the pedals to a wheel. Roller chains wear and stretch in use and the sprockets, with which they engage, wear until they break, slip or otherwise fail, requiring expensive replacement. To minimize wear the mechanism needs regular cleaning and lubrication. This is especially the case for bicycles used off-road where contamination by abrasive matter is unavoidable. Roller chain mechanisms also suffer from a number of other problems, for example, the chain can contaminate and snag the rider's clothing, the chain can become dislodged from the sprockets, shifting cannot readily take place when stationary and the shifting mechanism itself is prone to contamination and vulnerable to damage. Also the externally lubricated chain of a folding bicycle is likely to contaminate the user's clothing when the folded bicycle is carried.

The large pitch of roller chains, and the resulting small number of teeth on each sprocket, results in inconsistent ratio changes. This gives an inconsistent feel to shifting and requires a greater number of sprockets to be used to cover a given range of ratios while maintaining close ratio shifts.

The crank shaft carrying the pedals of a roller chain transmission bicycle must be mounted on the frame of the bicycle in front of the rear wheel so as not to interfere with the wheel's rotation. This, combined with the circular motion of the pedals, results in a pedaling action where the downward portion of motion of the pedal is short in comparison with the full motion, and occurs some distance in front of the rider's center of mass. Roller chain transmission bicycles with a short wheel base, as used in racing, suffer from toe overlap, where the rider's feet can interfere with the front wheel when steering.

Bicycles often incorporate suspension systems to improve riding on rough terrain. For a roller chain bicycle, the pivot point for the rear suspension on the frame must be substantially at the center of the crank shaft, to minimize variations in the center distance between the chain wheel on the crank shaft, and the sprockets on the rear wheel, as the suspension operates. The need to co-locate the crank shaft and suspension pivot mounting points, both of which require high strength and stiffness, can result in additional complexity, cost and weight.

Early bicycles, generally predating roller chain bicycles, used a variety of treadle mechanisms. One example used a pair of levers mounted on cranks connected to the steering, front, wheel with a link to the forks at their forward ends and a pedal at their rear ends. This mechanism does not have the same disadvantages as a roller chain transmission, but has a number of other disadvantages. This bicycle had no gearing, with the driven wheel rotating at the same frequency as the pedals thus limiting speed for a given wheel size. This bicycle did not have a free wheel mechanism so the rider was unable to rest his legs when moving, and it was not possible to set the position of a pedal to assist starting to ride. As the pedal and drive mechanism was mounted to the front wheel, forces from the rider's legs would interfere with the steering of the bicycle.

It is an object of the present invention to address the above problems.

SUMMARY OF THE INVENTION

In a main aspect of the present invention by using zero maintenance pedal arms and links connected to cranks protruding from a multi ratio gear and free wheel mechanism coupled to the rear driving wheel of the bicycle, the pedal arms having a geometry giving forward pedaling bias for a comfortable, practical and improved pedaling action.

According to the present invention there is provided a chainless drive mechanism for a bicycle having a frame and front steering wheel and rear non-steering wheel, the chainless drive mechanism having two pedal arms, one said pedal arm positioned in use on each side of the bicycle, each said pedal arm having a pedal connected thereto at the forward end thereof, said pedals connected to the pedal arms by rotating joints, each said pedal arm being mounted to a crank by a respective rotating joint, the rearward end of each said pedal arm being connected to the frame of the bicycle by a respective link, each said link having a respective rotating joint at each end, said cranks being rotatable and connected by a shaft through the hub of and in drivable communication with the rear non steering wheel of the bicycle, each pedal arm having a geometry where the center of the rotating joint connecting the link to the pedal arm is below a straight line between the center of rotation of the joint connecting the pedal to the pedal arm and the center of rotation of the joint connecting the pedal arm to the crank.

Advantages

The bicycle transmission mechanism suitably uses only rotary joints which can readily be sealed to retain lubricant and keep out contamination, providing a high efficiency zero maintenance mechanism. The pedal arms require no external lubrication and only reciprocate adjacent to the rider's legs and therefore will not snag or soil the riders clothing. The absence of externally lubricated components is a particular advantage to a bicycle designed to be folded and carried.

The geometry of the pedal arms, cranks and links results in a forward pedaling bias providing a comfortable and efficient pedaling action which is practical to use with a free wheel mechanism. The pedal arm mechanisms, being mounted from the frame adjacent to the rear wheel, allow rear suspension to be readily incorporated, using a simple pivoting joint, forward of the rear wheel, on the frame of the bicycle.

Preferably the cranks are connected to the wheel of the bicycle by a multi ratio gear and free wheel mechanism allowing comfortable and efficient riding over a range of riding conditions.

Preferably the multi ratio gear mechanism is fitted within the wheel hub of the bicycle and is sealed to retain lubricant and keep out contamination, so minimizing wear and eliminating the need for maintenance.

Preferably the multi ratio gear mechanism uses a number of epicyclical gear stages connected in series, the input to each stage at the carrier and the output at the ring gear, providing high efficiency, the ratios of the stages configured to give consistent ratio changes on shifting, to provide a consistent feel to the rider, and to cover the required range of ratios with a minimum number of ratios while maintaining close ratio shifts.

Preferably the gear ratios are selected by controllable pawls acting on ratchet wheels to selectively lock the sun gears of the epicyclical gear stages allowing shifting when the bicycle is stationary as well as when moving.

Preferably the length of the link connecting the pedal arm to the frame of the bicycle is readily adjustable to raise or lower the height of the pedals to suit the preference of the rider.

Preferably the length of the pedal arms places the pedals substantially below the saddle of the bicycle, providing an improved pedaling action where the rider can apply their full weight on the pedals, using articulation of the knee joint as well as of the hip joint, on the downward stroke, from a seated position. This pedal arm geometry positions the rider's feet away from the front wheel of the bicycle, avoiding toe overlap, even with a short wheel base.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of specification, illustrate embodiments of the invention, and together with the description serve to explain the principles of the invention.

A preferred embodiment of the present invention will now be more particularly described by way of example only and with reference to FIGS. 2 to 7 of the accompanying drawings.

Figure 2:
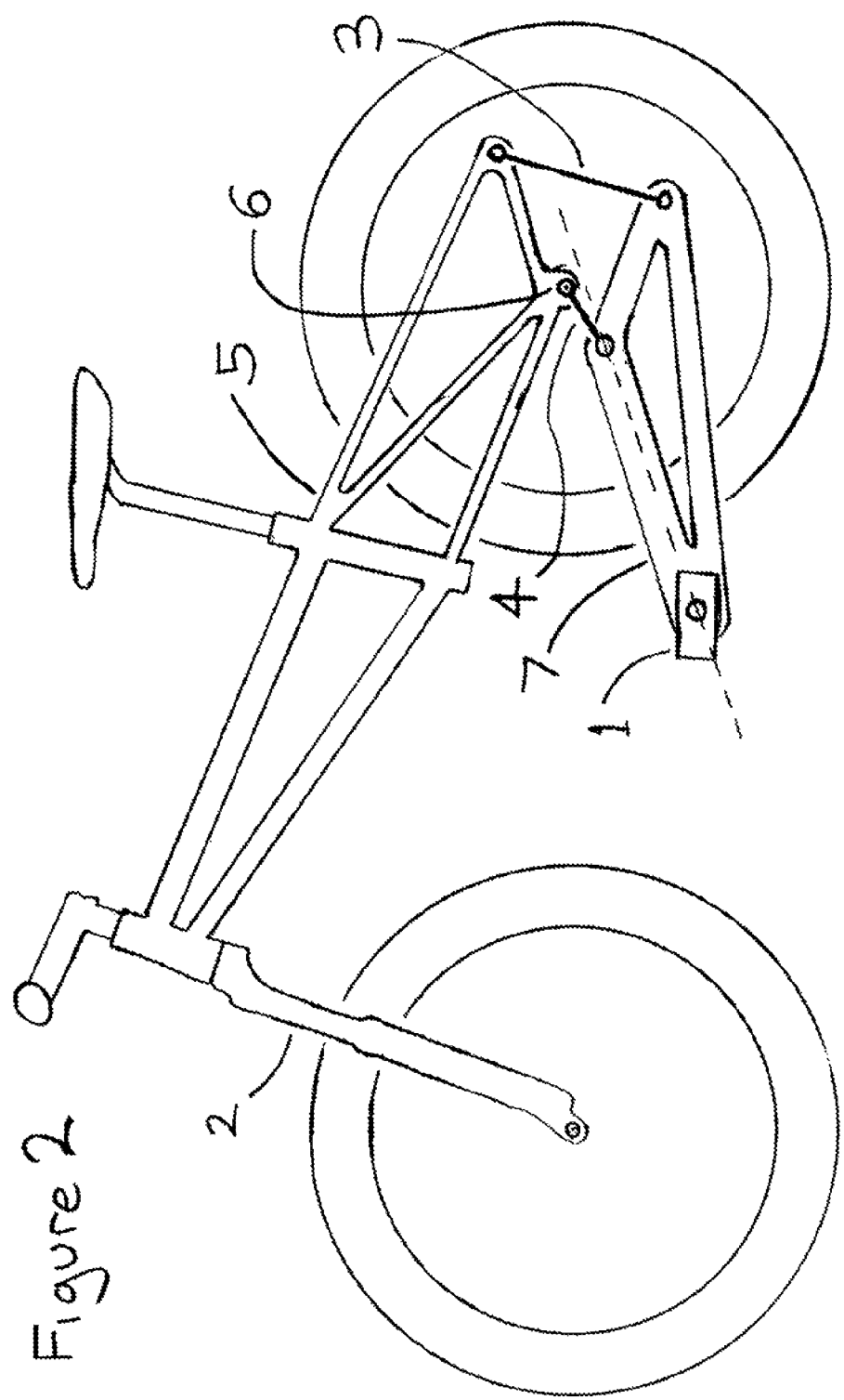

FIG. 2 shows a bicycle with pedal arm geometry embodying the present invention.

FIG. 3 shows diagrammatically the gear configuration for the preferred embodiment of the gear mechanism of the present invention.

FIG. 4 shows a plan view and two section views of the preferred shifting components of the gear mechanism.

FIGS. 5, 6 and 7 are a perspective view, right side view and front elevation view of the bicycle corresponding to FIG. 2 and showing the right and left side pedals at slightly different positions of turning as in use and showing in greater detail the connection of the pedal arm to the crank and to the link.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

DETAILED DESCRIPTION OF THE ILLUSTRATED PRIOR ART

Figure 1:
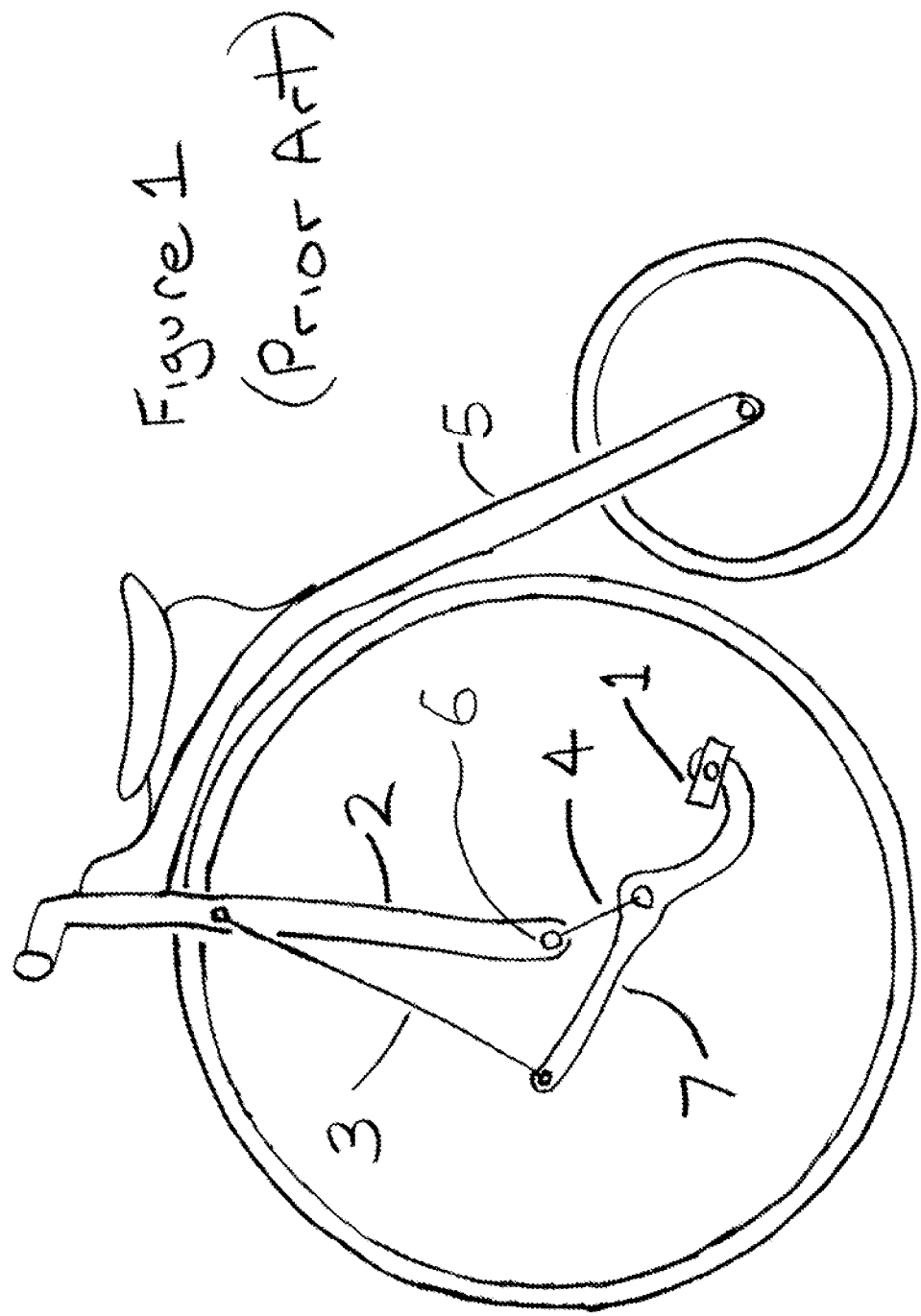
FIG. 1 shows an example of prior art showing the drive mechanism referred to as American Levers used on a bicycle known as an American Safety bicycle.

FIG. 1 shows the lever, link and crank mechanism, known as American Levers, from an example of prior art known as an American Safety bicycle, as described and illustrated in "Sturmey's Indispensable Handbook to the Safety Bicycle by Henry Sturmey, first published 1885. For clarity the mechanism from one side only of the bicycle is shown. A pedal 1 on which the rider pushes with a foot is mounted on the lower rear end of a lever 7. The lever is connected to the forks 2 of the bicycle by a link 3, the link having rotating joints at each end. The lever is connected to a crank 4, the crank being connected to the axle 6 mounted on rotating joints on the forks 2 of the bicycle and connected to the wheel.

This bicycle used a pair of cranks at 180 degrees displacement from each other, with one crank on each end of the axle through, and connected to, the front wheel, and two lever, pedal and link mechanisms, one on each side.

The purpose of this mechanism was to move the pedals towards the rear of the bicycle, compared to pedals mounted directly to the cranks, thereby allowing a riding position further behind the center of the front wheel, and therefore improving the stability and safety of the bicycle. As the bicycle moves forward, and the wheel and cranks rotate, the levers move up and down being attached to the cranks, and the pedals, with which the rider's feet engage, move in approximately elliptical paths. The rider causes the cranks to rotate, and so propels the bicycle by pushing the pedals in time with the motion As no free wheel mechanism is used the pedals are driven past the upper and lower points of travel by the forward momentum of the bicycle.

This bicycle has the disadvantage of having no gearing, with the driven wheel rotating at the same frequency as the pedals, so limiting speed for a given wheel size since the rate, often referred to as cadence, at which pedals can be operated efficiently by the rider's legs, is limited. This bicycle also has the pedal and drive mechanism mounted to the front wheel. While pedaling, forces from the rider's legs would therefore interfere with the steering of the bicycle, since the rider is seated on the frame of the bicycle but the pedals and drive mechanism are mounted on the forks. The front steering wheel must pivot relative to the frame and the rider's seat to steer, so the rider's legs will restrict steering movement. Also forces from the rider's legs will tend to steer the front wheel so requiring a reaction force to be applied at the handle bars by the rider's arms. This interaction between pedaling and steering therefore reduces stability and increases the skill and effort required to ride the bicycle.

This bicycle also had the disadvantage of not having a free wheel mechanism to allow a rider to rest their legs stationary on the pedals while the bicycle continues moving, for example on a decent. To commence riding on a bicycle with a free wheel mechanism the rider will often first set one pedal in a position at the start of a forward driving stroke. This is done by rotating the pedal backwards, allowed by the free wheel mechanism, to a suitable starting position using one foot while standing on the other foot. Forward motion can then be initiated by a combination of pushing off from the ground with one foot while starting to pedal forward with the other foot engaged with the set pedal. This gives the rider time to put the second foot on to the pedal and then continue pedaling before the bicycle slows to a point where balance is lost. In the case of this prior art bicycle, setting of the pedal in a starting position without rolling the bicycle forwards or backwards, which could be dangerous or impractical, especially when at a road junction, is not possible, as no free wheel mechanism is employed.

The lever and link mechanism of this prior art bicycle does not suffer from some of the disadvantages of a roller chain drive mechanism. The rotary joints of the mechanism can be readily sealed to retain lubricant and exclude contaminants. Use of this type of mechanism connected to the rear non steering wheel of a bicycle and incorporating a free wheel, multiple gear ratio mechanism therefore gives the possibility of overcoming the disadvantages of the roller chain drive. However, simple reversal of the mechanism from the prior art using a long link reaching upward and forward to the frame of the bicycle from the rear of the lever does not result in a practical mechanism. This arrangement results in a geometry where the highest point of travel of the pedal on one side of the bicycle occurs after the lowest point of travel on the other pedal. This makes pedaling forward impractical when a free wheel mechanism is used, especially when standing on the pedals, where the rider's weight on the lower pedal holds it at the lowest point and stops the higher pedal passing it's highest point. Some modification to the geometry of the mechanism is therefore required to provide practical and effective solution which can be used with a free wheel mechanism.

DETAILED DESCRIPTION OF THE PREFERRED EMBODIMENT

FIG. 2 shows a preferred embodiment of bicycle with the pedal arm and link geometry of the present invention. For clarity the mechanism from one side only of the bicycle is shown. A pedal 1 is mounted by a rotating joint to the forward end of a rigid pedal arm 7. The pedal arm is mounted by a rotating joint to a crank 4. The crank rotates around a crankshaft 6 which is mounted by a rotating joint to the frame 5. The pedal arm 7 is further connected to the frame by a link 3, the link having rotating joints at each end. It should be noted that the geometry of the pedal arm 7, has the connection to the link behind the connection to the crank and below a straight line, indicated by a dashed line in FIG. 2, through the pedal mounting position and the crank mounting position. This geometry requires the link to be substantially vertical to maintain reasonable angles between the link, to minimize forces in the link and the arm and to avoid the link crossing the center of the crank, and so a rearward extension to the frame of the bicycle is required to provide the connection point of the link to the frame. This particular geometry results in a forward pedaling bias with the highest point of travel of one pedal occurring before the lowest point of travel of the other pedal. When pedaling, therefore, as the rider's foot on one side of the bicycle reaches it's lowest point, the other pedal and foot has already started it's downward stroke, allowing a smooth continuation of the pedaling action, even if a free wheel mechanism is employed. This forward pedaling bias is particularly important when the rider is standing on the pedals where the rider's weight forces the pedal to stop at the lowest point as pedal pressure is transitioned to the opposite pedal.

It should be noted that with this preferred pedal arm geometry, the three mounting points on the arm for the rotary joints for the pedal, crank and link, form a triangle. The pedal arm therefore can be made as a triangular frame so providing high strength and stiffness.

The bicycle transmission mechanism according to the present invention uses a pair of cranks at 180 degrees displacement from each other with one crank on each end of the axle through, and connected to, the rear wheel, and two pedal arm and link mechanisms, one on each side.

It should be noted that in the preferred embodiment of the invention, the rotating joints used at each end of the link incorporate ball or spherical joints to allow for small misalignments in the mechanism due to manufacturing tolerance and the flexibility of the components under loads. Additionally, to maximize the efficiency of the mechanism, a low friction rolling element bearing, for example, a needle roller bearing is also incorporated into the joint. Self-aligning rolling element bearings, for example spherical roller bearings, could be used, however these tend only to be available in larger sizes which would add unnecessarily to the weight of the assembly.

Since the pedal arm is mounted on the crank, as the crank rotates it moves horizontally as well as vertically. The pedal therefore follows a path forming an open loop. It is thus possible for the rider to control the movement of the pedal past the extremes of movement making the use of a free wheel mechanism practical. This allows the rider to set the pedal into a starting position, in the same manner as when using a bicycle using a roller chain transmission and having a circular pedal motion.

For a bicycle using a roller chain drive mechanism the crank shaft carrying the cranks must be positioned some distance in front of the rear wheel of the bicycle so that the crank shaft, its bearings and the frame which supports it, do not interfere with the rotation of the rear wheel. This positions the crank shaft in front of the saddle. This combined with the length of the crank puts, the portion of the motion which is substantially vertically downward, which is small in comparison with the full travel, some distance in front of the saddle. When seated on the saddle, therefore, it is difficult for the rider to apply full downward force on the pedal since his or her weight is centered some distance behind the downward portion of motion of the pedal. The most efficient use of the rider's body is when the legs push vertically downwards reacting against the rider's weight, as this does not require any additional muscle action, for example by the arms through the handle bars, to react force on the pedals. Also in the downward portion of the movement of the pedal, the knee joint articulation is minimal. The muscles of the leg used to extend the knee joint are therefore poorly utilized. Knee joint articulation occurs mainly as the pedal travels over the top of its circular path. To make use of the knee extension muscles, therefore, requires force to be applied to the pedal in a forward rather than a downward direction and is therefore more difficult and additionally requires the use of toe clips or other devices to couple the rider's feet to the pedals.

Due to these limitations of the rotary motion of the pedals and the forward position of the crank shaft, in difficult riding conditions, for example, when riding up a steep slope or when accelerating, the rider of a roller chain bicycle will tend to rise off the seat and shift his or her weight forward vertically above the downward portion of the motion of the pedals. In this stance, full use of both the knee extension muscles and the hip joint extension muscles can be made. This stance, where the rider's weight is supported by the legs, is, however, tiring, and so is only generally used for short periods.

It should be noted that in the preferred embodiment of the present invention the pedal arm length is chosen to place the pedals substantially below the saddle of the bicycle, which is possible since the crank shaft passes through the wheel hub and the pedal arms carry the pedals adjacent to the wheel without interfering with its motion. Also, the length of the pedal arm, in combination with the length of the crank, means the motion of the pedal is substantially vertically up and down in a narrow loop. This preferred geometry provides an improved pedaling action where the rider can apply their full weight on the pedals, using articulation of the knee joint as well as of the hip joint, on the downward stroke while remaining in the seated position. Additionally it should be noted that due to the more linear motion of the pedals, compared to a roller chain drive mechanism using rotary pedal motion, a greater proportion of the travel of the pedal is in a near vertical sense and so more useful work is performed by the legs with force applied vertically downward reacting against the rider's weight. As a greater portion of the travel of the pedal is in a vertical sense a shorter overall stroke can be used allowing for more effort to be performed when the legs are close to full extension.

This preferred pedal arm geometry, placing the rider's feet substantially below the saddle, makes the forward most point of travel of the rider's feet substantially further away from the front wheel of the bicycle compared to a roller chain bicycle. A short wheel base bicycle is therefore possible without crossover, and so avoids the possibility of the rider's feet contacting the front wheel when steering, which could causing a fall.

It should be noted that a pedal arm transmission according to the present invention is suitable for use with or without toe clips. The use of toe clips or other devices which securely couple the rider's feet to the pedals has similar advantages as when used with a roller chain type transmission. The rider can exert considerably greater useful force on the drive mechanism by both a pulling action on the upward moving pedal at the same time as downward force on the other pedal. Since the pedals move in near vertical narrow loops, the vertical force from pulling up on one pedal can be reacted vertically down on the other pedal, resulting in useful work at both pedals with minimal additional reaction forces and minimal additional muscle effort being required.

It should be noted that a bicycle frame, for use with a pedal arm transmission according to the present invention, can readily be designed to incorporate suspension. Front suspension can be incorporated by the use of telescopic forks or other devices mounting the front wheel, as for a roller chain bicycle. For rear suspension, the frame can readily incorporate a pivot and a spring and damper unit to allow the rear wheel to move up and down relative to the saddle and forward section of the frame. The pivot can readily be positioned in front of the rear wheel and below the saddle since the transmission components are all mounted away from this area on the frame adjacent to the rear wheel. The joint, and the part of the frame connecting to it, can readily fit between the two pedal arms, and close to the position of the pedals. The pedals and seat of the bicycle, which support the rider, therefore move substantially in unison as the suspension operates, decoupling the rider from the vertical movement of the rear wheel.

It should be noted that a pedal arm transmission according to the present invention may incorporate a device to readily allow the adjustment of the length of the link. This allows for the convenient adjustment of the height of the pedals relative to the frame of the bicycle to cater for different rider proportions and preferences as well as varying riding conditions. This adjustment mechanism may take the form of a screw thread and suitable locking device. For a roller chain transmission bicycle, the height of the pedals cannot readily be changed as the center of rotation of the pedals is a fixed part of the frame of the bicycle. This adjustment of the height of the pedals can be used in conjunction with the use of cranks of different length to provide for varying pedal stoke length, without compromising pedal height, as would be the case on a conventional roller chain bicycle.

FIG. 3 shows, diagrammatically, the gear configuration for the preferred embodiment of the gear mechanism. The two pedal arms 7, 7a are shown on each side of the diagram in plan view carrying pedals 1, 1a and connected to the frame 5 by links 3, 3a. Cranks 4, 4a are connected by the crank shaft 6 which passes through the central axis of the gear hub assembly.

The gear hub assembly in this preferred embodiment of the present invention uses four epicyclical gear stages, 8, 8a, 9, 9a, Each of these epicyclical gear stages is configured to have the input to the planet carrier, the output from the ring gear, and the sun gear selectively connectable to the frame of the bicycle. This configuration of epicyclical gears gives a speed increase with the output from the ring gear rotating at a higher speed and in the same sense as the carrier when the sun gear is stationary. This configuration of epicyclical gearing provides the highest possible efficiency power transfer since the input and the output rotate in the same direction so the relative speed between the gear elements is low and therefore mesh loss is correspondingly low. The four epicyclical gear stages are connected in series. Planet carrier 16 is the input to the gear hub and is connected to the crank shaft 6 in the middle of the hub assembly. The ring gear 13 of this first stage 9 is connected to the planet carrier 17 of the second stage 8. The ring gear 10 of the second stage 8 is connected to the carrier 16a of the third stage 9a. The ring gear 13a of the third stage 9a is connected to the planet carrier 17a of the fourth stage 8a. The ring gear of the fourth stage 8a is connected to the hub case 18, which is connected to the wheel rim and tire of the bicycle.

Preferably axial location of each epicyclical gear stage is controlled by thrust rings, not drawn, fixed to either side of each ring gear which contact the outer edges of the planet gears, Each epicyclical gear stage has a one way clutch mechanism 19 between the carrier and the ring gear. In the case of this preferred embodiment of the present invention, the one way clutch mechanism takes the from of a spring loaded pawl, pivoting in the carrier, which engages with the teeth of the ring gear in one sense of relative rotation of the ring gear and carrier, and lifts out of engagement under the opposite sense of relative rotation of the ring and carrier. If the sun gear of a stage is not locked, and is free to rotate, then the sun will rotate forward with the carrier, the one way clutch mechanism will lock, and the ring will be driven at the same speed as the carrier. With the sun gear released, therefore, the stage is locked, and drives from input to output without speed increase, and without relative rotation of the gears, so minimizing frictional loss.

It should be noted that within the scope of the present invention a one way clutch mechanism may be used to act between any two of the elements of the epicyclical gear stage, so to lock the stage and provide a connection from input to output, without a ratio change, when the sun gear is not connected to the frame of the bicycle. Also it should be noted that a ratchet wheel or ring may be used attached to one of the elements on which a pawl or other catch may act to provide a one way clutch mechanism. Other one way clutch mechanisms will no doubt be known to one skilled in the art which could be employed between elements of the epicyclical stage to achieve the desired function according the present invention for example a sprag clutch or a roller clutch.

Each of the four sun gears is selectively connectable to the frame of the bicycle by a controllable pawl 20 which engages with ratchet teeth inside the bore of each of the larger sun gears 12, 12a and on the inside of rings 21 and 21a connected to the two smaller sun gears 15, 15a.

It should be noted that, for reasons of clarity, bearings have not been included in the diagram. It should also be noted that each of the bearings on the outside of the gear hub, for example between the hub and the frame of the bicycle or between the crank shaft and the frame of the bicycle, are readily sealed and therefore the hub assembly in the preferred embodiment of the invention will be sealed. A volume of lubricant can therefore be retained within the hub to continually lubricate all the components, to protect from wear and minimize friction, so maximizing efficiency. The sealing of the hub also prevents ingress of contaminants, for example water or grit, which would otherwise cause rapid wear of the components of the hub. Regular maintenance, therefore, is not required.

FIG. 4 shows a diagrammatical plan section view of the gear selection components of the preferred embodiment of the present invention, being a portion of FIG. 3, and two further section side views to illustrate the function thereof.

The pawls 20 and 20a are controlled by pins 22 and 23 which are substantially parallel with the axis of the gear hub. These pins pivot on ball ends located in the casing at their outboard ends and engage with holes in the pawls at their inner ends. Pin 23 is longer than pin 22 so as to reach the pawl acting on the ring 21 mounted further inside the hub assembly. Small springs 27, 27a act on the pins to push them outwards. The pins, therefore, will push the pawls outward and into contact with the ratchet teeth 28 cut on the inside of the sun gear 12. Alternatively, the spring may act on the pawl to provide the same function. Similar teeth, not drawn, are provided on the inside of the ring 21 for locking the smaller sun gear 15. A shift control ring 24 is fitted around the two pins. The ring has a series of notches 26 cut on its inside diameter. The inside diameter of the ring is chosen so that when the ring is rotated to a position where there is no notch in line with the pin, the ring contacts the pin, holding it inwards, and so holding the pawl inwards clear of the ratchet teeth, so allowing rotation of the sun gear. If the ring 24 is rotated so that a notch is in line with the pin, the pin can lift by action of the spring allowing the pawl to contact the ratchet and lock the rotation of the sun gear. In a non-preferred embodiment of the invention the pins may be acted upon by control members with a pre-determined pattern of notches, of a form other than a ring, for example a rod.

In this preferred embodiment of the present invention the ring is rotated by a gear shift control cable connected to a handle bar mounted indexing shifter as commonly used to control derailleur gears. Other means of controlling the movement of the shift control ring are possible and will no doubt be familiar to one skilled in the art, for example by means of an electric servo motor or a hydraulic actuator.

Two similar shift mechanisms are used, one on each side of the hub. The two shift control cables 25, 25a are connected in parallel to the same indexing shifter so that the two shift rings 24, 24a move in unison. A predetermined sequence of gear selections can therefore be achieved by the design of the pattern of notches cut on the inside of the shift control rings.

The lowest ratio achievable is with none of the gear stages engaged. A 1:1 ratio is then provided with each stage locked by its one way clutch mechanism, and the hub case and wheel then rotate at the same speed as the cranks. No gears rotate so efficiency is maximized.

If, when the bicycle is moving, the rider stops pedaling, any of the one way clutches or pawl and ratchet rings in the gear mechanism can operate to allow the input to remain stationary as the bicycle continues to move forward. The gear configuration therefore inherently has a free wheeling function.

The highest ratio achievable is with all four stages engaged. Since the stages are connected in series the overall ratio in this state is the multiple of the four individual ratios.

The preferred embodiment of the present invention uses two epicyclical gear stages of one ratio and two of another ratio. The two ratios are chosen to achieve a high number of different gear ratios as well as substantially similar ratio changes between consecutive gears for the majority of shifts. Using two stages of one ratio and two of another also reduces the number of different components used in the assembly. In this preferred embodiment of the present invention the higher of the two ratios is substantially equal to the lower ratio raised to the power of one and a half. Combinations of the four stages can then provide a number of consecutive gear ratios with a change in ratio being substantially the square root of the lower of the stage ratios.

By way of example, in the preferred embodiment of the present invention, the lower of the epicyclical gear stages uses 70 teeth for the ring gear 23 teeth for each planet gear and 23 teeth for the sun gear, providing a ratio of approximately 1.329:1. The higher of the epicyclical gear stages uses 70 teeth for the ring gear, 16 teeth for each planet gear and 38 teeth for the sun gear, providing a ratio of approximately 1.543:1.

The lowest ratio is 1:1 with no stages engaged. This ratio is typical of the lowest gear used in bicycles designed for use off road when climbing steep slopes. The second ratio is when one of the lower ratio epicyclical stages is engaged and is 1.329:1. The third ratio is with one of the higher stages engaged and is 1.543:1. The next ratio is with the two lower stages engaged and is 1.766:11. The next ratio is with one lower and one higher stage engaged and is 2.051:1. The next ratio is with two higher gear stages engaged and is 2.381:1. The next ratio is with two lower and one higher stage engaged and is 2.725:1. The next ratio is with two higher and one lower stage engaged and is 3.164:1. The highest ratio is with all four stages engaged and is approximately 4.205:1 This highest ratio is suitable for high speed riding downhill.

The preferred embodiment of the invention therefore provides nine distinct gear ratios from 1:1 to 4.205:1. The change in ratio between the first and second ratio and between the eighth and ninth ratio is 1.329. The change in ratio between each of the other gears is approximately the square root of the lower stage ratio, which is approximately 1.15, giving a 15% increase in ratio with each shift.

Other choices of gear tooth numbers can be chosen to provide wider or closer ratios as desired for different applications within the scope of the present invention. Larger numbers of gear stages may be employed to provide different ratios for other application for example where a smaller wheel size is employed or where a greater number of distinct ratios is required, within the scope of the present invention. Smaller numbers of stages may be employed for simplicity where a lower number of ratios are acceptable, within the scope of the present invention.

For a bicycle requiring only one ratio a single epicyclical gear stage may be used for example with the input to the carrier, the ring gear fixed to the frame of the bicycle, and the output from the sun gear.

For controlling the speed of the bicycle it is desirable to use brakes which act to slow the wheels of the bicycle as demanded by the rider. A brake can be included in the design of the gear hub for example a brake disc may be mounted on the outside of the hub and a corresponding brake caliper mounted to the frame of the bicycle. Other forms of brake, as will no doubt be familiar to one skilled in the art, may be included internally in the hub or acting on the rims of the wheel. A brake fitted to the hub commonly referred to as a coaster brake, which is operated by rotating the pedals backward, could also be used.

It will no doubt be obvious to one skilled in the art that, within the scope of the present invention, other possible gear mechanisms can be used to connect the cranks to the wheel of the bicycle, particularly if having a small number of different ratios is acceptable. For example, simple lay shaft gear arrangements mounted beside the wheel with the case fixed to the bicycle frame could be used. Most conveniently this form of gearing would select different ratios by selectively connecting the gears on the secondary shaft using a free wheel clutch. A 1:1 ratio could be provided by the inclusion of a free wheel mechanism between the wheel and the crank shaft when no selection in the lay shaft gearing was made, Multiple gears around the crank shaft and on the secondary shaft could be used to provide more than one ratio in addition to a 1:1 ratio. Alternatively, for a narrow assembly more than one secondary shaft could be employed.

The invention is not intended to be restricted to the details of the above-described embodiments. A myriad range of other embodiments and variations fall within the spirit and scope of the present disclosure.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A chainless drive mechanism or a bicycle having:
a frame;
a front steering wheel; and
a rear non-steering wheel;
the chainless drive mechanism having two pedal arms, one said pedal arm positioned in use on each side of the bicycle, each said pedal arm having a pedal connected thereto at the forward end thereof, said pedals connected to the pedal arms by rotating joints, each said pedal arm being mounted to a crank by a respective rotating joint, the rearward end of each said pedal arm being connected to the frame of the bicycle by a respective link, each said link having a rotating joint at a first end connecting the link to the pedal arm and a rotating joint at a second end connecting the link to the frame, said cranks being rotatable and connected by a shaft through a hub of and in drivable communication with the rear non steering wheel of the bicycle, each pedal arm having a geometry where the center of the rotating joint connecting the link to the pedal arm is below a straight line that passes between the center of rotation of the rotating joint connecting the pedal to the pedal arm and the center of rotation of the rotating joint connecting the pedal arm to the crank.

2. A chainless drive mechanism for a bicycle according to claim 1, wherein the pedal arms are triangular frames.

3. A chainless drive mechanism for a bicycle according to claim 1, wherein the length of the links are adjustable.

4. A chainless drive mechanism for a bicycle according to claim 1, wherein at least one of the rotating joints at one or both ends of each said link is a combination of self-aligning and low friction rolling element bearings.

5. A chainless drive mechanism for a bicycle according to claim 1, wherein the cranks are connected to the rear wheel of the bicycle by a gear mechanism.

6. A chainless drive mechanism for a bicycle according to claim 5, in which the gear mechanism comprises a plurality of epicyclical gear stages, each said epicyclical gear stage having a sun gear, a plantet gear, a carrier and a ring gear and an input to the carrier, output from the ring gear and the sun gear being selectively connectable to the frame of the bicycle and each said epicyclical gear stage being fitted with a one way clutch mechanism.

7. A chainless drive mechanism for a bicycle according to claim 6, in which the one way clutch mechanism is a pawl mounted on, and pivoting on, the carrier, said pawl acted on by a spring and engageable with gear teeth of the ring gear.

8. A chainless drive mechanism for a bicycle according to claim 6 in which the gear mechanism uses a plurality of epicyclical gear stages of a first ratio and a plurality of epicyclical gear stages of a second ratio where the second ratio is substantially equal to the first ratio raised to the power of one and a half.

9. A chainless drive mechanism for a bicycle according to claim 6, in which the gear stages are connected in series.

10. A chainless drive mechanism for a bicycle according to claim 6, wherein each sun gear is selectively connectable to the frame of the bicycle using a controllable pawl acting on a ratchet, the pawl being controlled by a pin substantially parallel to a gear hub axis, one end of the pin engaged with the pawl a second position on the pin engaged with the frame of the bicycle and a third position on the pin engaged with a notched control member, a spring acting on the pin or pawl to urge the pawl into contact with the ratchet.

11. A chainless drive mechanism for a bicycle according to claim 5, wherein the gear mechanism is an epicyclical gear mechanism.

12. A chainless drive mechanism for a bicycle according to claim 1, incorporating a brake.

13. A bicycle comprising the drive mechanism of claim 1.

14. A bicycle as claimed in claim 13, having clips or attachments whereby the rider's feet are securely coupled to the pedals in use.

15. A bicycle as claimed in claim 13, wherein the pedal arm length places the pedals substantially below the saddle of the bicycle.

16. A bicycle as clamed in claim 13, wherein the bicycle is adapted to be folded.

\* \* \* \* \*